United States Patent Office 3,122,988
Patented Mar. 3, 1964

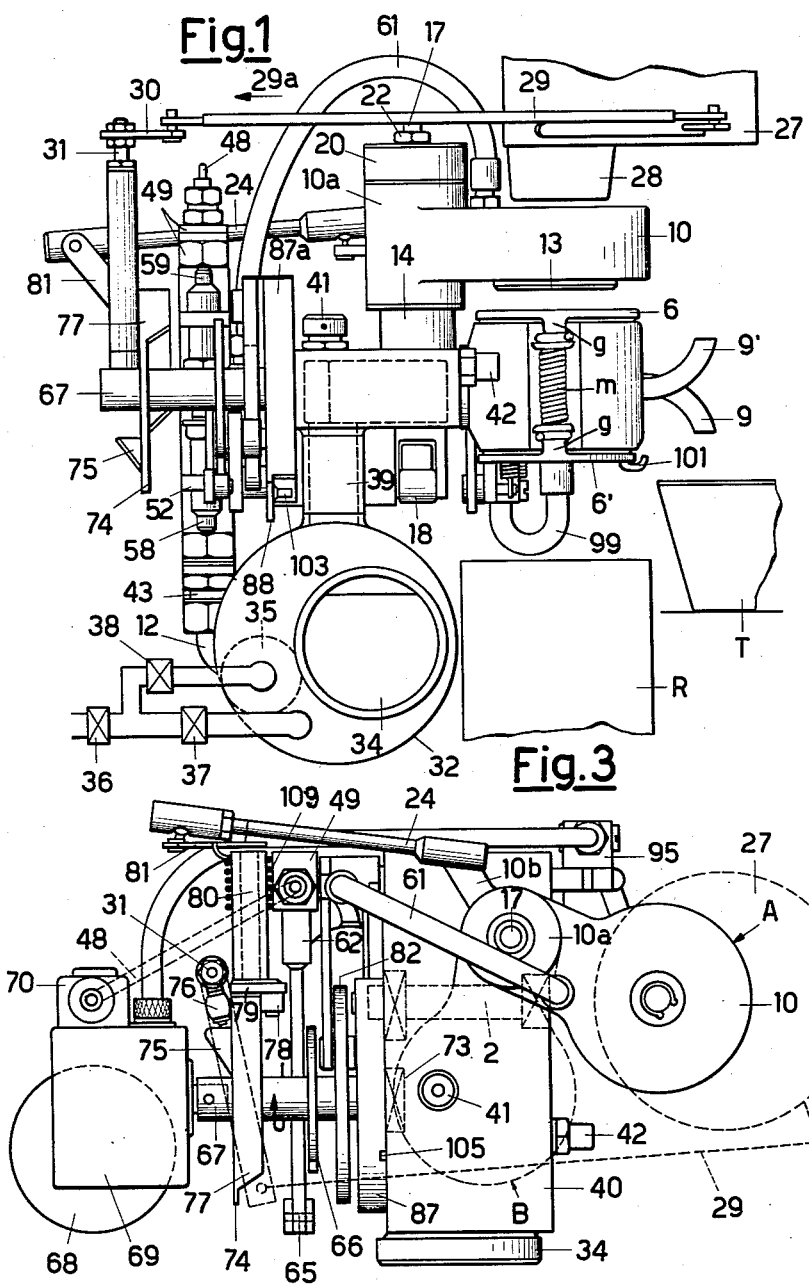

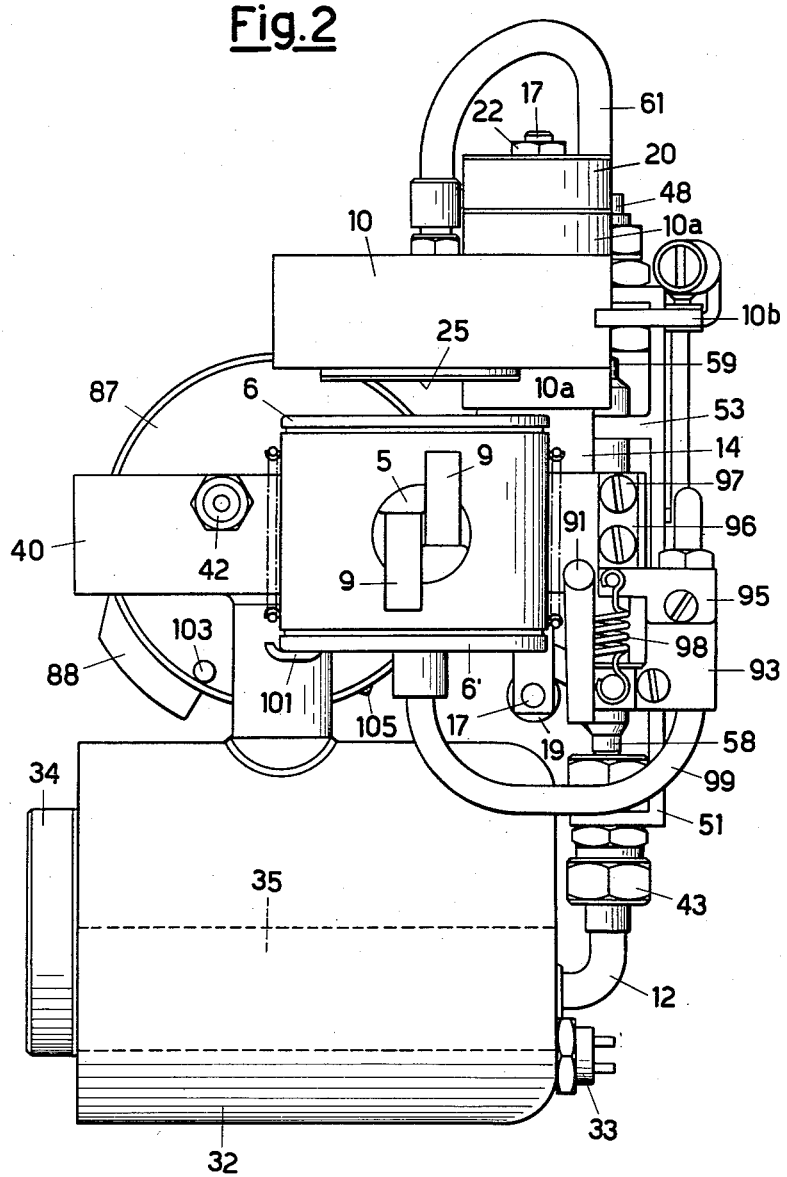

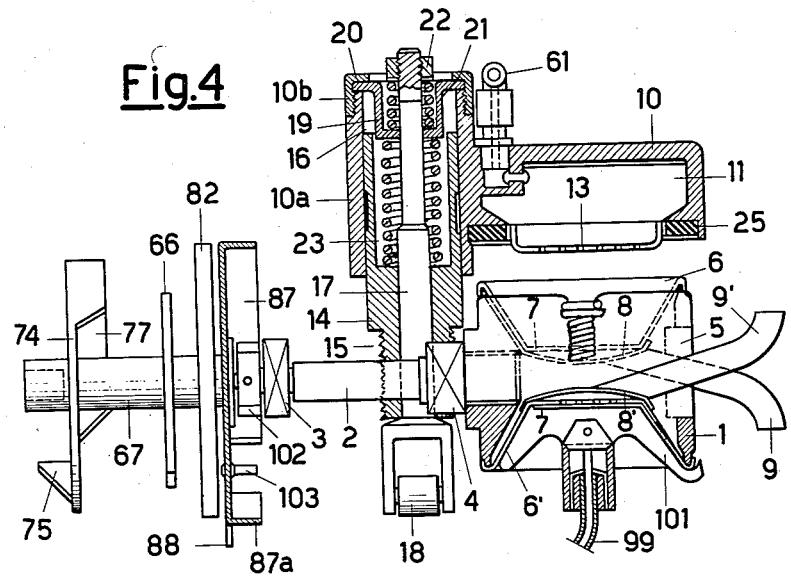
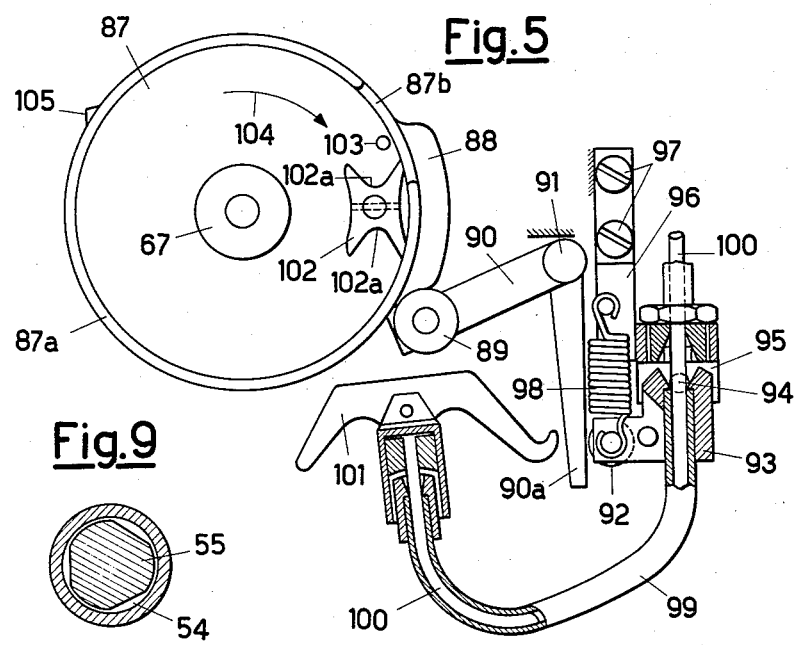
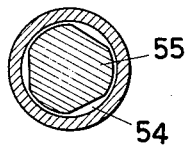

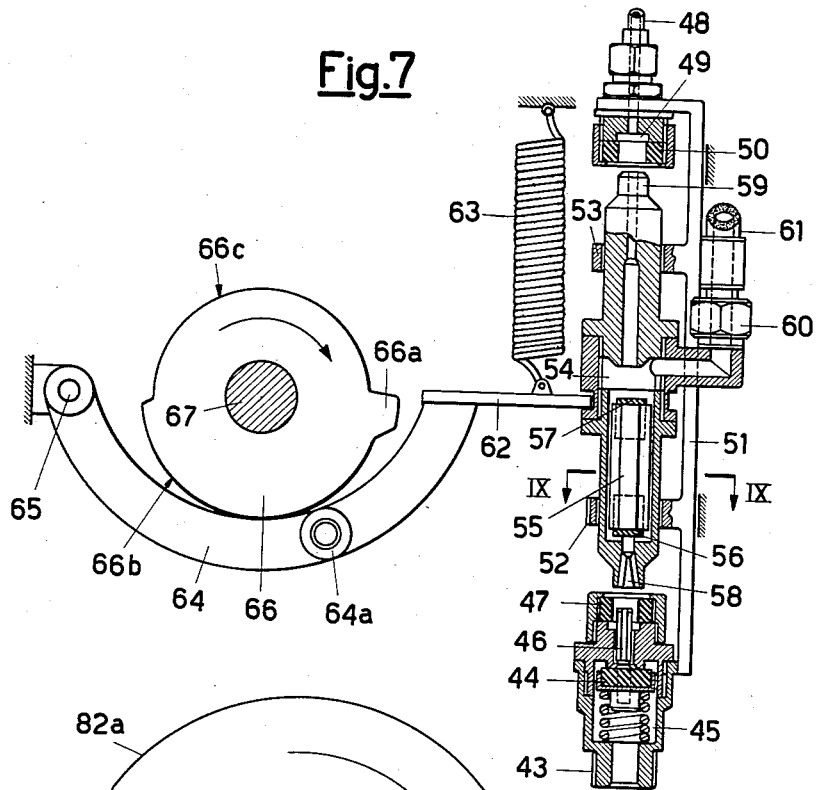
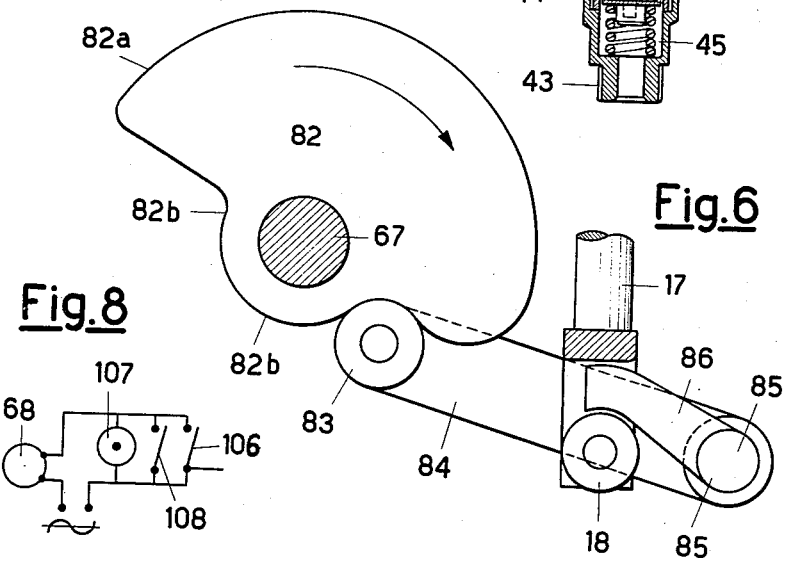

3,122,988
AUTOMATIC MACHINE FOR THE PREPARATION OF COFFEE INFUSION IN DOSES SUFFICIENT FOR ONE OR TWO CUPS
Beniamino Rota, Brandizzo, Turin, Italy
Filed Nov. 21, 1961, Ser. No. 153,933
Claims priority, application Italy Nov. 23, 1960
5 Claims. (Cl. 99—302)

The present invention relates to automatic coffee infusion machines.

It is an object of the present invention to provide an automatic machine for the preparation of coffee infusion in doses sufficient for one or two cups.

According to the present invention said machine is controlled from a main drive shaft driven by a motor and determining the predetermined succession of the operations of the various members of the machine. Said shaft carries four discs with cam surfaces which control through lever mechanisms the operation of a measuring device for ground coffee, the oscillations of a cover feeding hot water to the filter containing coffee powder, a distributor supplying successively hot water and air under pressure to the cover, and also the action of a device for the cleaning of the filter which is in an upside-down position. The main drive shaft moreover is coupled with a pin fixed to the support body of the two filters of the machine, in such a way as to make said pin turn by 180° once for each revolution.

Other characteristics and advantages of the invention will result from the following description with reference —by way of example without limitation—to the accompanying drawings illustrating one practical embodiment thereof, and wherein:

FIGURE 1 is a side elevation in detail of the device according to the invention with the exception of the motor assembly;

FIGURE 2 is a front elevation of the device with the measuring device and the respective control means omitted;

FIGURE 3 is a plan view of the machine, with the filter support assembly omitted and the motor and gear reducer diagrammatically shown;

FIGURE 4 is a side view partly in section of the filter support assembly and the cooperating members;

FIGURE 5 is a front view partly in section of a cam controlling the rotation of the filter support assembly and of a device for cleaning filters;

FIGURE 6 is a front view of the cam and of the respective lever mechanisms for controlling displacement of the cover through which the filters are fed with hot water and compressed air;

FIGURE 7 is a front view of the cam and of the respective lever mechanisms for controlling the feed of hot water and compressed air in the cover cooperating with the filters while also showing a section of the respective distributor member;

FIGURE 8 diagrammatically shows an electric circuit for controlling the motor which drives the machine;

FIGURE 9 is a section taken along line IX—IX of FIGURE 7 on an enlarged scale.

The essential elements of the machine according to the invention have been illustrated, but the support framing and the external shell have not been shown and can clearly be of any shape or form desired. The machine, as shown, comprises a filter support assembly including a cylindrical body 1 and a lateral support 2 mounted rotatably in the bearings illustrated diagrammatically at 3 and 4.

The body 1 has an internal cavity the axis of which is perpendicular to the lateral support 2 and is in communication with the exterior also through a side aperture 5 (FIGS. 2 and 4). In the cavity of the body 1 there are inserted from the opposed sides two identical filters 6, 6', the bottoms 7 and 7' being respectively provided with series of small holes through which the coffee can pass. Each filter has a bent-in border superimposed on the border of the cavity of the body 1, and the bent-in borders of the two filters are arranged with their bottoms opposite each other. The opposed filters each carry a pair of hooks $g$ to which are connected the springs $m$ that serve to connect the filters to one another and retain them in their seats provided in the body 1. To the bottom of each of the filters there is superimposed a member having the shape of a flatened cup 8 and 8' respectively, the interior of which is in communication with the small tubes 9 and 9' respectively that are fixed to the bottoms of the cups and are arranged inclined in such a way as to cross one another and have their mouths turned in the same direction as the bottoms of the respective cups. Above the body 1 there is provided a cover 10 whose inner cavity 11 is in communication, by way of a flexible pipe 61, with a distributor for hot water and for compressed air, to be described hereinafter. The cover 10 is supported by a vertical pin 14 fixed by means of the threaded portion 15 to the base member 40 rigid with the frame of the machine (not shown).

The pin 14 penetrates into a cylindrical bore 16 provided in a bush 10a rigid with the cover 10 which therefore can shift along the pin 14 and rotate around it. The pin 14 presents in its upper part a cylindrical cavity which opens upwards and is in communication with an axial hole into which there penetrates a rod 17 which passes through the pin 14 and projects upwards with respect to the bush 10a of the cover. The rod 17 is terminated at the bottom thereof by a fork carrying a small roll 18. On the upper portion of the rod 17 there is fitted a cup 19 perforated at its center and equipped with a flange superimposed on the upper border of the bush 10a and retrained by a cap 20 threadably engaged with the uppermost portion of the bush 10a. In contact with the bottom of the small cup 19 are two springs 21, 23. Spring 21 contacts the nut 22 which is screwed onto the top of the rod 17, and the spring 23 rests on the bottom of the internal cavity of the pin 14. The bush 10a carries a lever arm 10b to the end whereof there is fixed, by means of an articulated joint, a rod 24 (see FIGURES 1 and 3) the movements of which cause rotation of the cover 10 between the position marked by A and indicated by full lines in FIG. 3, and the position marked by B and indicated by dotted lines in the same FIG. 3.

The cover 10 is provided at the bottom thereof with a circular opening into which there is inserted the perforated cover 13. Cover 13 is surrounded by an annular gasket 25 of rubber which ensures the sealing tightness between cover and filter. Above the body 1, at a level higher than that which the cover 10 occupies in its lifted position illustrated in the drawings, there is placed a measuring device 27 for ground coffee, the structure of which is known per se and, therefore, will not be described herein in detail. This measuring device has an outlet 28 coaxial with the filters 6 and 6' and is controlled by the displacements of a rod 29 articulated at the end of the arm 30 fixed at the top of a rotatable vertical pin 31. The measuring device 27 becomes operative in response to means which will be described hereinafter and which causes displacement of the rod 29 in the direction of the arrow 29a (see FIG. 1), only if the cover 10 occupies the position indicated by B in FIG. 1.

The machine also comprises a small kettle 32 under the base member 40. The heating of the water contained in the kettle is effected preferably by means of an electric resistor 33. The kettle is also equipped with an inspection hole in the shape of a small bull's eye 34 for the checking of the water level. According to a preferred embodiment the kettle is directly connected to the water distributing main if there is one in the place where the machine is installed, and is provided with a heat exchanger of a structure known per se, as indicated diagrammatically by 35 in FIGS. 2 and 3, which can be put in communication with the water coming from the source. The water supply for the machine is fed by way of a distributor group comprising three cocks, 36, 37 and 38 respectively.

A thermostat (not shown) is provided for controlling the resistor and the kettle has at top a hollow small column 39 connecting the kettle with a chamber provided by casting in the base member 40 in which the steam is collected and condensed. This chamber is placed in the proximity with the rotary body 1 and in the proximity of the pin 14 supporting the cover 10. This arrangement permits keeping the filters 6 and 6′ and the cover 10 at a constant and very high temperature. At top of the chamber provided in the base member 40 there is provided a safety valve 41 and laterally a take-off 42 for taking off steam for sundry uses. The distributor (FIG. 7) supplies the cover 10 alternately with hot water and air under pressure as furnished by a special small compressor. A connection 43 has its outlet turned upwards and is normally closed by the valve 44 loaded with a spring 45 and carrying a stem 46. The stem 46 passes through the hole connecting the interior of the connection with the outside and penetrates into the outlet of the hole constituted by an annular gasket 47 of synthetic rubber retained by a ferrule. Above the connection 43 there is placed coaxially thereto a connection 49 for the supply of air under pressure, connected by means of the small pipe 48 with the small compressor. The outlet of the connection 49 is also constituted by an annular rubber gasket retained by a ferrule and without any valve. The connections 43 and 49 are supported by the terminal branches of a stirrup 51 of U shape rigid with the machine framing. The distributor proper is constituted by a small cylinder of elongated shape mounted slidably between the connections 43 and 49, within guides provided in the intermediate stems 52 and 53 of the U-stirrup 51. The small cylinder is substantially composed of three fundamental elements and has provided therein an inner chamber 54 of circular cross-section in the lower part of which there is slidably mounted a body 55 carrying at its ends gaskets 56, 57 of elastic material. The cross-section of the body 55 and of the respective gaskets 56 and 57 are represented in FIG. 9, and are such as to permit a free flow of water along the body 55.

The body 55 and its gaskets 56 and 57 act as valves cooperating with seats provided at the opposed ends of the chamber 54 and in communication with holes opening at the ends of projections of reduced diameter 58 and 59 respectively provided at the opposed ends of the small cylinder. The projections 58 and 59 face the annular gaskets 47 and 50 carried by the connections 43 and 49. The interior of the chamber 54 is in communication with the interior of a flexible pipe 61 the other end of which is connected to the cover 10. The small cylinder containing the valve 55 is normally kept in the intermediate position, as illustrated in FIG. 7, by the fork 62 subjected to the action of a spring 63 anchored at the framing of the machine. The fork 62 is fixed at the end of a lever 64 having the shape of a circular segment fulcrumed at 65. The lever 64 is placed by the side of a discs 66 carried on the main drive shaft 67 of the machine. The periphery of the disc 66 cooperates with a small roll 64a carried by the lever 64 and presents a nose 66a and two surfaces with constant radius 66b and 66c respectively more and less distant respectively from the axis of the shaft 67.

The machine is controlled by an electric motor or by a hydraulic motor, indicated diagrammatically at 68 (FIG. 3). To the motor there is associated a reducer 69 that controls a small compressor 70 and the main drive shaft 67, the opposed end of which is supported by a roller bearing 73. The drive shaft 67 carries fitted thereon, in addition to the disc above described, three further discs with cam surfaces.

The first disc 74 (see FIGS. 1, 3 and 4), carries at one side a cam surface 75 adapted to cooperate with the small roll 76 rotatable on an arm fixed at the lower end of the pin 31 the rotation whereof controls the operation of the measuring device 27 (FIG. 1). At the opposite side the disc 74 presents a front cam surface 77 cooperating with a small roll 78 mounted rotatably on the arm 79 fixed at the one end of the horizontal pin 80 while at the other end of the pin 80 there is fixed an arm 81 which in turn is connected by means of an articulation, with the rod 24 whose displacements control the oscillations of the cover 10.

As seen in FIG. 6 the second disc 82 cooperates with a small roll 83 mounted rotatably at the end of the lever 84 rigid with the pin 85 supported rotatably in the framing of the machine and carrying a short arm 86 the end end of which, being slightly curved, is superimposed to the small roll 18 mounted in the fork of the rod 17. It is apparent that the rotation of the cam 82 becomes translated into periodical displacements in vertical direction (once about each half revolution of the shaft 67) of the rod 17 and therewith of the cover 10.

The third disc 87 has at its periphery a cam surface 88 cooperating with a small roll 89 fixed at the end of one of the arms of the lever 90 fulcrumed at 91. The end of the other arm of the lever 90a cooperates with a small roll 92 mounted rotatably on a pin rigid with the support 93 supported to oscillate, with the interposition of a pair of coaxial pins 94, in a fork 95 rigid with the stirrup 96, fixed by screws 97 to the framing of the machine. The support 93 and the stirrup 96 are connected with each other by means of a spring 98 (FIG. 5) which constantly keeps the blade 101 pressed into the filter to be cleaned. To the support 93 there is fixed a small tube 99 of U-shape through which passes a flexible cable 100 the end of which is connected to the reducer 69 that rotates the cable 100 at the speed of 35 or 40 revolutions per minute. The other end of the cable 100 is fixed to the blade 101 the shape of which corresponds to the internal shape of the filter. The blade 101 contacts to the lateral walls and the bottom of the filter 6′ which is oriented in an upside-down position. When the small roll 89 is engaged by the cam 88, the oscillation of the levers 90 and 90a causes the support 93 and the small tube 99 carrying the blade 101, to oscillate in a counterclockwise sense and thereby disengage the blade 101 completely from the upside-down filter, thus permitting the rotation of the cup 10. The blade 101 is shown in a position in which it is partially inclined and in the process of being withdrawn from the filter.

As will be seen in the drawings, and in particular in FIGURES 3 and 4, the axes of the shaft 67 and of the pin 2 of the body 1 lie in a common horizontal plane but are displaced with respect to each other. The shaft 2 carries at its end turned towards the disc 87 a small plate 102 shaped like an X and having two radial grooves 102a wherein there can be engaged a small pin 103 carried by the disc 87. This latter has an axial flange 87a against which are constantly resting the ends of the two arms of the X being placed at the same side of the middle plane of the small plate 102, in such a way as to keep it normally with its grooves 102a arranged vertically. The rotation of the small plate 102 is made possible by the presence of an interruption 87b in the flange 87a. The amplitude of this discontinuity is such as to permit the small plate 102 and with it the pin 2 and the body 1 carrying the filters 6 and 6′ to effect a rotation of 180° for each revolution of the shaft 67.

Moreover the disc 87 carries, in an appropriate angular position, a small peripheral tooth 105 effective to open and to close, a microswitch inserted in the feed circuit of the motor 68 as illustrated diagrammatically in FIG. 8. As will be seen the feed of the power to the motor is established by the closing of the microswitch 106 cooperating with the small tooth 105 and cooperating with the push-button 107, and closing the contact 108 for continuous operation.

Operation of the machine is as follows:

To start the machine it suffices to press the push-button 107. This causes rotation of the motor 68 which drags along with it in rotation, by way of reducer 69, the main drive shaft 67. Immediately afterwards, the small tooth 105 leaves the microswitch 106 thereby causing closure thereof. Thus one avoids stoppage of the motor after release of the pushbutton 107. After the rotation of the shaft 67 the cam 75 actuates the small roll 76. This oscillates the lever 30 in a clockwise direction, which oscillates the rod 29 which in turn actuates the mechanism (not illustrated) that causes dispensing from the measuring device 27, 28, of a load of ground coffee to the filter 6 (FIG. 4).

Immediately, afterwards, the front cam 77 acting upon the small roll 78 rotates against the action of the spring 109 the pin 80 and the respective arm (see FIG. 3), and displaces the rod 24 along with the cover 10 from the position B to the position A. On termination of this operation there begins the cooperation between the peripheral surface 82a of the cam 82 and the small roll 83 carried by the lever 84 which in oscillating causes the lowering of the arm 86 and the dragging along of the small roll downwards. As a consequence the rod 17 is lowered and, consequently, the cover 10 is lowered, until obtaining a perfect closure of the filter 6, due to the superimposition of the gasket 25 onto the upper border of the filter and strong compression against the border. The cover 10 remains in the latter position during the rotation of the shaft 67 through an angle of about 180°. Subsequently the disc 66 starts action (FIG. 7), which through its peripheral tooth 66a acting upon the small roll 64a, lowers the lever 64 for a short time, for instance for three seconds. The lever 64 displaces by means of its arm 62 and against the action of the spring 63 the distributor in the direction towards the connection 43. The descent of the distributor causes end 58 thereof to penetrate into the annular gasket 47 in such a manner as to cause sealing contact while also pushing the tappet of the valve 44 against the action of the spring 45 and thereby opening the valve. The pressure of the water lifts the gravity valve 55 to close the opening in the chamber 54 and the small flexible tube 61.

The hot water therefore enters the internal chamber 11 of the cover 10, and the filter.

Immediately thereafter, the lever 64 is displaced upwards under the thrust of the spring 63. This displacement of the lever 64 detaches the lower end 58 of the distributor, while the valve 44 closes. The distributor in shifting upwards enters with its upper end 59 the annular gasket 50 thereby establishing the contact between the chamber 54 and the conduit 48 connected to the compressor 70. The air that was previously dispersed to the outside now flows to the filter following the same path as the water did namely through the flexible small tube (61) while keeping the valve 55 closed at its lower portion namely at its seat 56.

In that way, to the conduit 61 and to the cover 10 there flows compressed air which expels the hot water from the conduit 61 to the cover 10 making it pass through the coffee powder in the filter 6 and finally said air dries said powder. On termination of this operation, after about half a revolution of the shaft 67, the lever 64 starts cooperation with the cam surface 66b of the disc 66 and takes the distributor back to the intermediate position illustrated in FIG. 7, thereby discharging to the outside the pressure existing in the cover 10 which follows then accurately the path followed previously in the contrary direction, and the air coming from the compressor becomes dispersed to the outside.

At that time the small roll 83 ceases cooperating with the peripheral surface 82 of the disc 82 (FIG. 6), and the spring 23 lifts the cover 10 to its initial position.

In the meantime the axial cam 77 of the disc 74 disengages the small roll 78 and the lever 81 performs a rotation under the action of the spring 109 thereby displacing the rod 24 and rotating the cover 10 around the pin 14 in such a manner as to move the cover from position A to position B.

The peripheral cam 88 in the disc 87 acts upon the small roll 89 carried on the lever 90 coupled to the lever 90a which against the action of the spring 98 lowers the blade 101 from the filter, the blade rotating within the filter 6' previously under the action of the cable 100 to clean the filter 6'.

Subsequently the small dowel 103 carried by the disc 87 acts upon the member 102 fitted at the end of the pin 2, rotating it by 180°, as previously described, and reversing the position of the filters 6 and 6'. After the reversal of the position of the filters the roll 89 disengages from the cam surface 88 and the blade 101 returns to the initial position penetrating into the interior of the filter 6 which now is in an upside-down position, while removing the bottoms which fall into a special receptacle.

A further rotation of the shaft 67 brings the small tooth 105 in register with the microswitch 106, which opens, interrupting the supply of electric current to the motor 68, with consequent stoppage of the machine. If the operation of the machine is desired to be continued with an indefinite repetition of its operating cycles; the switch 108 should be held permanently closed. In this case to stop the machine it will be necessary to re-open the switch 108.

Of course, following the principle of the invention, its details may be widely varied with respect to what has been described and illustrated, without departing from the scope of the invention.

I claim:

1. Coffee making apparatus comprising a hot water boiler, a cover adapted for being connected to the hot water boiler and to a compressed air source, a body located adjacent said cover and adapted for supporting a coffee filter, means supporting said cover and body for relative movement to permit said cover to be brought into sealing contact with the coffee filter, a main control shaft supported for rotation, a plurality of cam discs supported on said shaft and adapted for controlling the coffee making operation of the apparatus, a distributor operatively controlled by one of said cam discs for selectively feeding to the cover compressed air and hot water from the boiler, connections for said hot water boiler and said compressed air source fixedly arranged in coaxial relation, said distributor including a distributor body having open ends and slidable between said connections to establish communication between the distributor body and respective of said connections, means establishing communication between said distributor body and said cover, a valve body having opposite ends and slidably supported within said distributor body, and gasket means on the ends of the valve body for respectively sealingly closing the open ends of the distributor body, said valve body in a normal position blocking the open end of the distributor body associated with the hot water connection, said valve body being displaced to close the other of the open ends of the distributor body under the action of water pressure with said distributor body displaced by said one cam disc to a position in communication with said connection for said hot water boiler.

2. Apparatus as claim in claim 1 wherein said connections are disposed in a vertical line and said valve body initially blocks, under the action of gravity, the hot water connection which is located below the distributor body.

3. Apparatus as claimed in claim 1 comprising a valve in said connection for the hot water, and a spring urging the latter valve to a closed position, said distributor body including a projection which is effective to displace said latter valve to an open position with the distributor body displaced to a position in communication with the hot water connection.

4. Apparatus as claimed in claim 1 comprising a lever mechanism coupled to said distributor body for displacing the latter and including a roller in contact with said one cam disc, and a spring engaging said lever mechanism to exert a force thereon tending to move said distributor body towards the connection for the compressed air, said cam disc including a first cam surface which contacts said roller and holds the distributor body in said normal position against the action of said spring, said cam disc including a projecting tooth which contacts said roller and is effective to displace said lever mechanism and the distributor body therewith to a position in communication with the hot water connection, said cam disc further including a second cam surface located at a radial distance from said shaft less that that of the first cam surface to enable said spring to displace said lever mechanism and the distributor body therewith to a position in communication with the compressed air connection.

5. Apparatus as claimed in claim 3 comprising a rod on said valve in the hot water connection extending towards the projection on the distributor body, the latter contacting the rod to displace the same and the valve in the hot water connection therewith with said distributor body displaced to a position in communication with the hot water connection.

References Cited in the file of this patent
UNITED STATES PATENTS

| | | |
|---|---|---|
| 2,014,325 | Grilli | Sept. 10, 1935 |
| 2,898,844 | Gaggia | Aug. 11, 1959 |
| 2,910,928 | Rota | Nov. 3, 1959 |